United States Patent [19] [11] 4,116,944
Hill et al. [45] Sep. 26, 1978

[54] POLYESTER PROCESS

[75] Inventors: James C. Hill, Chesterfield; Walter R. Knox, St. Louis, both of Mo.

[73] Assignee: Monsanto Company, St. Louis, Mo.

[21] Appl. No.: 874,309

[22] Filed: Feb. 2, 1978

Related U.S. Application Data

[63] Continuation-in-part of Ser. No. 646,306, Jan. 2, 1976, abandoned.

[51] Int. Cl.$^2$ .................... C08G 63/00; C08F 18/14
[52] U.S. Cl. .................................... 528/366; 260/861
[58] Field of Search ................. 260/75 EP, 78.41; 526/11.2

[56] References Cited

U.S. PATENT DOCUMENTS 2,966,479  12/1960  Fischer .................... 260/75 EP
3,213,067  10/1965  Pohl et al. ................ 260/75 EP
3,374,208   3/1968  Seiner et al. ............. 260/75 EP
3,723,390   3/1973  Carpenter et al. ........ 260/75 EP
3,766,145  10/1973  Thompson ................ 260/75 EP Primary Examiner—Lucille M. Phynes
Attorney, Agent, or Firm—J. C. Logomasini; P. L. Passley; N. E. Willis

[57] ABSTRACT

The present invention provides a process for the production of a polyester having an acid number which is not greater than 65 which comprises reacting an acid anhydride with a monoterminal epoxide in the presence of a solvent for the polyester in such a way that a self-sustaining reaction is initiated within 200 seconds of the reactants being mixed together and said reaction results in the attainment of a maximum peak temperature within 200 seconds of initiation.

17 Claims, No Drawings

POLYESTER PROCESS

BACKGROUND OF THE INVENTION

This application is a continuation-in-part of co-pending application Ser. No. 646,306 filed Jan. 2, 1976, now abandoned.

This invention relates to polyesters and specifically polyesters obtained by the reaction of dicarboxylic acid anhydrides with epoxides.

It is well known that linear polyesters are obtained as a result of the reaction of an epoxide with a dicarboxylic acid anhydride. Early work on this subject is described in an article by R. F. Fischer in Journal of Polymer Science Vol. XLIV, pp. 155–172 (1960). In that article, Fischer examined the reaction of epoxides such as allyl glycidyl ether, epichlorohydrin, propylene oxide and vinylcyclohexene mono-epoxide with anhydrides such as phthalic anhydride and maleic anhydride to produce linear polyesters. He found that the reaction was catalyzed by tertiary amines and quaternary salts, that the molecular weight of the polyester could be controlled by the presence of active hydrogen-containing compounds such as alcohol and water and that the reaction is independent of monomer concentration.

A similar reaction is described in U.S. Pat. No. 2,966,479 which describes heating a polybasic acid anhydride with a mono-epoxide in the presence of a catalyst which is a tertiary amine or a quaternary ammonium salt, under substantially anhydrous conditions and at a temperature of above 70° C.

The reaction producing linear polyesters can be more fully appreciated by reference to the following reaction formula. The anhydride is maleic anhydride though this is only for the sake of illustration, and it is understood that the maleic anhydride could be wholly or partially replaced by a different cyclic acid anhydride.

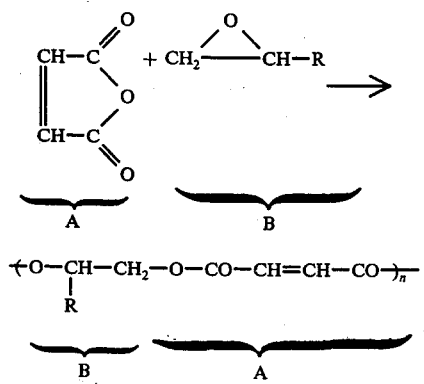

where R is a monovalent hydrocarbyl radical.

It will be obvious that, in theory at least, a mono-epoxide reacted with an anhydride will produce a linear product having an (A BA B AB)-type structure. However, in practice it is necessary to take steps to avoid or minimize consecutive addition of epoxy units which gives rise to polyether segments. In addition when maleic anhydride is used special techniques must be used to avoid crosslinking via the double bond of the anhydride. Polyether segments usually lead to soft, rubbery polymers and cross-linking via the double bonds of the maleic anhydride gives rise to polyesters that are black weak foams (the result of partial decomposition of anhydride) with no commercial value.

The properties of linear polyesters vary according to the epoxide used. With alkylene oxides such as ethylene oxide the polyesters have a much lower polymer melt temperature than with e.g., styrene oxide. Likewise polyesters made with succinic or glutaric anhydrides have lower polymer melt temperatures than those made using maleic or phthalic anhydrides.

Linear polyesters of this type incorporating an unsaturated anhydride such as maleic anhydride have found significant commercial applications in the form of solutions in styrene which are copolymerized in the presence of glass fibers to provide the well-known fiberglass-type products.

Typical of the processes in this field are those described in U.S. Pat. Nos. 3,822,325 and 3,723,390. Both described processes in which the addition of the epoxide is staged to minimize the formation of polyether segments.

Water has been variously described as an initiator and a retardant for the reaction. For example, in U.S. Pat. No. 3,374,208 the use of certain metal salts as catalysts and the replacement of water with glycol as initiator are recommended.

A large number of possible catalysts for the process have been described. In U.S. Pat. No. 3,213,067, for example, the patentee recites alkali metal salts and hydroxides, alkaline earth metal salts and hydroxides, and organic amine salts and hydroxides. In U.S. Pat. No. 2,966,479 the specified catalysts are tertiary amines and quaternary ammonium salts.

The reaction of epoxide with anhydride has been observed to be exothermic and in a number of patents, specific mention is made of the need to control the temperature to avoid discoloration. Thus, U.S. Pat. Nos. 3,822,325, 3,483,169, 3,213,067 and 2,966,479, for example, all set specific temperature ranges within which the reaction must be conducted.

It has now been found that when conducted in a certain novel manner, the reaction between an anhydride of a dicarboxylic acid and a mono-terminal epoxide can be controlled to give a substantially quantitative yield of a polyester with a low acid number without at the same time becoming cross-linked and therefore insoluble in organic solvents such as acetone. Moreover, it has been found that the above results can be achieved in a fraction of the time taken by prior art processes not involving complicated multistage reactions.

SUMMARY OF THE INVENTION

The present invention provides a process for the production of a polyester having an acid number which is not greater than 65 which comprises:

a. forming a mixture of a diacid anhydride with a mono-terminal epoxide in an anhydride to epoxide molar ratio of from 1:1 to 1:1.5 in the presence of a solvent for the polyester and from 0.2 to 0.0001 mole per mole of anhydride of a catalytically effective quaternary salt and, optionally, in the presence of up to 0.2 mole of water per mole of anhydride, b. initiating a non-self-sustaining exothermic reaction between the epoxide and the anhydride, c. raising the temperature of the mixture to a point at which the exothermic reaction becomes self-sustaining, and d. controlling the reaction conditions such that the temperature of the reaction mixture is not reduced until the maximum peak temperature has been reached in the reaction mixture and substantially all available monomer has been consumed;
the time spent in stages b and c combined being less than 200 sec. and the time taken in stage d from the initiation of the self-sustaining exothermic reaction to the attainment of the maximum peak temperature being also less than 200 seconds.

The reaction between the epoxide and the anhydride proceeds in two stages. In the first stage, the reaction is mildly exothermic but non-self-sustaining. By this is meant that if external heat to the reaction mixture is removed, the reaction would slow down and cease leaving a substantial proportion of the monomer unreacted.

The second stage of the reaction begins when the reaction mixture reaches a point at which, if external heat to the reaction mixture is removed, it would nevertheless continue to evolve heat until a peak temperature is reached, the rate of evolution of heat by the exothermic reaction has begun to decrease and substantially all available monomer consumed and only thereafter would the temperature of the reaction mixture drop. At this point the reaction becomes "self-sustaining" as the term is used herein.

It is recognized that if the reaction were to be carried out in a very thin mold or in the presence of a large amount of inert material that could act as a heat sink, the amount of surface heat lost through the walls of the mold could necessitate the addition of heat to ensure that the reaction proceeds to completion. The term "self-sustaining" therefore must be understood to refer to the nature of the reaction when performed using 5.00 gm of given reaction mixture in a 20mm × 150mm pyrex glass test tube having a thickness of 1.2mm.

The time periods specified above are important since during the non-self-sustaining reaction stage, many relatively short polymer chains are being formed and these apparently do not combine to any very great extent after the rapid self-sustaining reaction is initiated. Thus, if the first stage is prolonged a large number of polymer chains are formed and the size of the individual polymer molecules in the final product is much reduced. The consequence is a lower polymer melt temperature and higher acid number and reduced properties in the final polymer. It is therefore critical that the chain forming reaction proceed as quickly as possible and this is an important characteristic of the process of the invention. Prolongation of the time to reach to the maximum temperature likewise results in shorter chains and higher acid number.

Whenever referred to herein the acid number is understood to mean the mg. of potassium hydroxide needed to neutralize free (residual or terminal) acid groups and residual anhydride in one gram of the polymer and the acid number and the polymer melt temperature are measured by the methods described in "Preparative Methods of Polymer Chemistry" by Sorenson and Campbell (Interscience Publishers, Inc., 1961).

The term quaternary salt is intended to cover quaternary ammonium and quaternary phosphonium salts as well as mixtures of compounds which would form a quaternary salt in situ, such as a mixture of a tertiary amine and a $C_1$-$C_{10}$ alkyl or aralkyl halide.

By the term "catalytically effective quaternary salt" is to be understood a quaternary salt that, when mixed with styrene oxide and phthalic anhydride in an oxide to anhydride to salt molar ratio of 1.3:1.0:0.17 and heated at 180° C. and atmospheric pressure initiates an exothermic reaction in less than 160 seconds which reaches a peak temperature of from 229° to 237° C. in a period of from 18 to 45 seconds after initiation to yield a linear polyester having a polymer melt temperature of at least 50° C. and an acid number not greater than 65.

It is already known that the reaction between anhydride and epoxide is exothermic. It has not, however, been noted heretofore that when the reaction mixture is heated rapidly to a point at which a highly exothermic self-sustaining reaction is initiated, the final polyester product has an acid number which is directly related to the time taken to initiate the exothermic reaction after mixing the reactants.

Moreover, it has been noted that provided the rate of temperature change during the exothermic reaction is not reversed until after the maximum peak temperature is reached and substantially all available monomer has been consumed, and said peak temperature is reached in less than 200 seconds, the resultant polymer will have a relatively high polymer melt temperature and a low acid number.

The rapid initiation and completion of the process of the invention is in marked contrast to prior art processes which are described as taking, in most cases, several hours. This is because, rather than encouraging the inception of the self-sustaining exothermic reaction and thereafter allowing it to proceed without applying cooling, the reaction temperature is only allowed to rise slowly to a maximum that is kept as low as is feasible.

It has, however, been found that the acid number of the final product is directly dependent on the time taken after initiation of a non-self-sustaining reaction to reach the initiation of the self-sustaining exothermic reaction. This is quite contrary to the teachings in the prior art which recommend controlled reactions lasting several hours to avoid by-products and discoloration.

A further advantage of the present invention lies in the fact that, where the anhydride is maleic anhydride, it is possible to cause isomerization of the maleate group to furmarate to take place during the reaction itself instead of performing the isomerization on the polyester product. Isomerization is generally considered desirable since the fumarate polyester is found to have a higher polymer melt temperature than the corresponding maleate polyester. Conventionally this is done on the finished polyester using a catalyst such as morpholine because the rapid reaction as is explained in U.S. Pat. No. 3,723,390 (Col. 6, lines 41–63) is linked to limited success in achieving isomerization. Surprisingly, with the present process a considerable degree of isomerization can be achieved by incorporating the isomerization catalyst in the reaction mixture itself. The polyester can of course be isomerized in the conventional way if desired.

The epoxide component of the reaction mixture is one having the structure

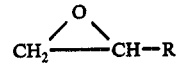

wherein R is hydrogen, an alkyl, aryl or alkaryl radical. Examples of suitable R groups include alkyl groups such as methyl, ethyl, propyl and aromatic groups such as benzyl, toluyl, phenyl and naphthyl as well as ring or side-chain-substituted groups of such aromatic groups.

The most readily available and in many ways the most convenient members of these groups are ethylene oxide, propylene oxide and styrene oxide and these are in fact the preferred epoxides for use in the process of the invention. As will be appreciated with some aliphatic epoxides it will be necessary to provide that the reaction be carried out under pressure to prevent excessive loss through volatilization at the reaction temperatures encountered.

The anhydride component is an anhydride of a dicarboxylic acid having an anhydride group represented by the generalized formula

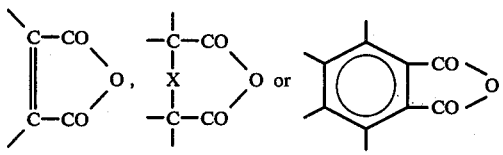

wherein —X— can be a single bond or an alkylene group having 1 to 6 carbon atoms.

Typical anhydrides include maleic anhydride, succinic anhydride, glutaric anhydride, adipic anhydride, and phthalic anhydride with maleic and, to a lesser extent, phthalic being particularly preferred.

The catalyst, under the influence of which the reaction takes place, is a quaternary salt having the formula $R_4MX$ where M is N or P, R are the same or different $C_1$-$C_8$ hydrocarbon radicals and X is a halogen, such as bromine or chlorine, or an alkoxy, phenoxy or hydroxyl group. Examples of $R_4M$ are tetramethyl ammonium, tetraethyl ammonium or tetrabutyl ammonium and the corresponding phosphonium ions. Preferred catalysts are tetraalkyl ammonium halides and hydroxides and especially tetraethyl ammonium bromide and tetramethyl ammonium hydroxide. Other suitable catalysts are indicated on Table 1 below.

The amount of catalyst generally required can be anything from a molar ratio of 0.2:1 to 0.0001:1 of catalyst to anhydride. However, for most purposes a molar ratio of from 0.01:1 to 0.001:1 of catalyst to anhydride is adequate.

When the anhydride component is an unsaturated anhydride such as maleic anhydride, it is found that the tendency of the polymer to crosslink across the unsaturated linkage can be controlled by the introduction of water into the reaction mixture. In the event the anhydride is not unsaturated, e.g., when phthalic anhydride is used, it is found that the presence of a certain amount of water helps by initiating the reaction and thereafter actually retards the reaction. Thus the presence of water, although not required, may be desired in certain instances, and the amount in which it is present depends on the nature of the anhydride used and the properties of the polyester desired. In practice for both types of anhydrides the water level can vary in the range of 0 to 0.2 mole per mole of anhydride. Generally when an unsaturated anhydride is used to prepare an unsaturated polyester, water is preferred and the amount of water present in the reaction mixture is from 0.075 to 0.20 mole per mole of anhydride.

Any solvent in which the polyester is soluble can be used in this invention. Generally, the solvent will be an organic material having a boiling point above 140° C. However, solvents having a lower boiling temperature, such as ethylbenzene, can be employed in this invention when conducted under suitable pressure conditions to permit the reaction to reach the maximum peak temperature. Suitable solvents include styrene, mesitylene and mixtures of meta and para-diethylbenzenes. With the present process, it is possible to form the polyester in the presence of a copolymerizable monomer as the solvent, such as styrene without cross-linking occurring until a specific catalyst, usually a peroxide such as ditertiary butyl peroxide or cumyl peroxide, is added to the reaction mixture. This is a preferred feature of one aspect of the invention.

When an unsaturated polyester is cross-linked with, for example, styrene as described above, a hard, rigid matrix is formed and this can be used to support glass-fibres (to produce "fiberglass") or a coarse filler material such as sand to produce polymer concrete.

Of course, many other fillers can be used with saturated, unsaturated or cross-linked polyesters to produce a range of products with a wide variety of end uses.

The reaction is performed under closely defined conditions of time and temperature, and these are significant in achieving the desired result.

The polymers of the invention are prepared by a process characterized by a very rapid self-sustaining exothermic stage. Now the exothermic nature of the epoxide/anhydride reaction has been recognized in the past and attempts have been made to curb this heat evolution. Thus, the reaction vessel has been equipped with cooling devices such as cooling coils, the epoxide reactant has been added in stages and the reaction has been conducted in the presence of a diluent serving as a heat sink.

It has now been found, however, that the molecular weight of the polymer in the final product (as reflected by the acid number of the final product) is dependent on the time between the initiation of a non-self-sustaining exothermic reaction and the point at which the exothermic reaction becomes self-sustaining and also on the time from the initiation of the self-sustaining reaction to the attainment of the maximum temperature reached and therefore on whether any cooling has occurred prior to that point sufficient to reverse the rate of temperature change. Thus, in a preferred form of reaction, the reactants are mixed and the temperature raised as quickly as possible to above the point at which the self-sustaining exothermic reaction is initiated and thereafter allowed to proceed without significant cooling at least until a peak temperature in excess of 200° C. has been reached.

As a matter of practice, if is preferred that for most reactant combinations, the reaction mass is heated to above the temperature at which the rapid self-sustaining exothermic reaction proceeds without need for further heating, in up to 200 seconds such as up to about 160 seconds and more preferably from about 45 to 60 seconds.

The time for the reaction mixture to reach its maximum temperature, measured from the time the self-sustaining reaction is initiated is less than 200 and preferably less than 100 seconds. Frequently, only about 30 to 60 seconds or less are required.

Of course, a limited amount of cooling may be permitted, but anything that reverses the rate of temperature change or prolongs the attainment of the maximum temperature leads to an increased acid number in the final product and, therefore, a lower molecular weight of the individual polymer molecules.

The maximum temperature reached is also an important feature of the process of the invention since a maximum of about 200° C. or less, achieved by controlling the temperature profile of the reaction by cooling means (and incidentally prolonging the time for attainment of the maximum temperature thereby) results in a higher acid number in the final product. Thus, the maximum temperature reached is in excess of 200° C. and preferably 220° C. or more.

In reactions of the sort described above, it is conventional to use a glycol as an initiator. This is often desirable in the process of the present invention also but it is found that, using a catalytically effective quaternary salt (as the term is used herein), the effect of a glycol such as styrene glycol is relatively minor.

SPECIFIC EMBODIMENTS

The invention is further described with reference to the following examples which set forth the characteristic features of the polymers prepared by the process of the invention.

EXAMPLE 1

Reactant mixtures containing the anhydride, oxide, solvent and catalyst as indicated in Table 1 are prepared and separately charged to a 200 ml., 3-necked, sound-bottomed flask equipped with a magnetic stirring bar, a nitrogen inlet line, a thermometer and a reflux condenser. The flask is immersed in an oil bath having an initial temperature as indicated in Table I. Further reaction conditions and results are shown in Table II. The polyesters were recovered by distilling off the solvent.

TABLE 1

| | CHARGE IN GRAMS | | | | |
|---|---|---|---|---|---|
| Run | Styrene Oxide | Anhydride* | Solvent** | 25% Aqueous TMAH | Initial Oil Bath Temp. C. |
| a | 31.54 | 19.61 | 21.91 | 0.84 | 153 |
| b | 27.63 | 22.55 | 21.50 | 0.89 | 153 |
| c | 34.60 | 17.65 | 22.50 | 0.83 | 153 |
| d | 31.54 | 19.61 | 21.91 | 0.88 | 165 |
| e | 31.54 | 19.61 | 21.91 | 0.94 | 180 |
| f | 31.54 | 19.61 | 21.91 | 0.66 | 205 |
| g | 31.54 | 19.61 | 21.91 | 0.78 | 200 |
| h | 31.54 | 29.62 | 21.91 | 0.79 | 202 |
| i | 31.54 | 20.01 | 21.91 | 0.78 | 205 |

NOTE:
TMAH is tetramethylammonium hydroxide
Run g contained 1.46 grams of morpholine
*Runs a thru g - maleic anhydride
Run h - phthalic anhydride
Run i - succinic anhydride
**Runs a thru c - ethylbenzene
Run d - styrene
Run e - mesitylene
Runs f thru i - M, p-diethylbenzene

TABLE 2

| RUN | TIME TO EXOTHERMIC STAGE, SEC. | THRESHOLD OF EXOTHERMIC STAGE, ° C. | TIME FROM THRESHOLD TO MAX. TEMP., SEC. | MAX. TEMP. ° C. | ACID NO. | POLYMER MELT ° C. |
|---|---|---|---|---|---|---|
| a | 150 | 115 | 15 | 147 | 71 | 52–61 |
| b | 135 | 110 | 15 | 143 | 134 | 48–68 |
| c | 150 | 106 | 30 | 148 | 29 | 47–68 |
| d | 130 | 110 | 20 | 157 | 62 | 67–78 |
| e | 100 | 115 | 20 | 172 | 45 | 59–71 |
| f | 85 | 115 | 15 | 178 | 49 | 55–75 |
| g | 60 | 113 | 30 | 178 | 55 | 65–74 |
| h | 135 | 150 | 15 | 190 | 47 | 58–68 |
| i | 120 | 125 | 30 | 182 | 24 | Tacky |

EXAMPLE 2

This Example demonstrates the effect of the presence of water in the reaction of an unsaturated anhydride with an epoxide.

a. To a 200 ml, 3-necked, round-bottomed flask equipped with a magnetic stirring bar, a nitrogen inlet line, a thermometer and a reflux condenser were charged 19.61 grams (0.20 mole) of maleic anhydride, 31.54 grams (0.26 mole) of styrene oxide, 21.91 grams (0.20 mole) of styrene, 0122 gram (0.012 mole) of water and 0.22 gram (0.0024 mole) of tetramethylammonium hydroxide. The flask was immersed in an oil bath at 168° C. At 112° C., reached after 2.5 minutes, a rapid self-sustaining exothermic reaction was initiated, a maximum temperature in excess of 200° C. was reached and after 5 minutes a rubbery cross-linked mass had been formed.

b. Run a above was repeated with the difference that the amount of water was increased to 0.66 gram (0.037 mole). The run went smoothly to give a solution of predominantly poly(styrenemaleate) in styrene. This solution was polymerized using a peroxide initiator in the presence of conventional concrete filler materials to produce a tough water impermeable "polymer concrete."

The above Examples are intended for use as illustration only of the general principles underlying the invention. It will be obvious to one moderately skilled in the art that many variations to and modification of the processes described herein could be made without departing from the essential character of the invention, such as the incorporation of conventional antioxidants, stabilizers, coloring material and the use of conventional techniques for rendering the product flame-retardant. It is intended that all such modifications and variations should be included within the full scope of the invention.

What is claimed is:

1. A process for the production of a polyester having an acid number which is not greater than 65 which comprises:
    a. forming a mixture of a diacid anhydride with a monoterminal epoxide in an anhydride to epoxide molar ratio of from 1:1 to 1:1.5 in the presence of a solvent for the polyester and from 0.2 to 0.0001 mole per mole of anhydride of a catalytically effective quaternary salt and, optionally, in the presence of up to 0.2 mole per mole of anhydride of water,
    b. initiating a non-self-sustaining exothermic reaction between the epoxide and the anhydride,
    c. raising the temperature of the mixture to a point at which the exothermic reaction becomes self-sustaining, and
    d. controlling the reaction conditions such that the temperature of the reaction mixture is not reduced until the maximum peak temperature has been reached in the reaction mixture and substantially all available monomer has been consumed;

the time spent in stages b and c combined being less than 200 sec. and the time taken in stage d from the initiation of the self-sustaining exothermic reaction to the attainment of the peak temperature being also less than 200 seconds.

2. A process according to claim 1 wherein the solvent is an ethylenically unsaturated monomer that is copolymerizable with the polyester product.

3. A process according to claim 1 wherein said polyester has a polymer melt temperature of at least 50° C. said diacid anhydride is an unsaturated dicarboxylic acid anhydride, and water is present in an amount of from 0.075 to 0.20 mole of water per mole of anhydride.

4. A process according to claim 3 wherein said anhydride is maleic anhydride.

5. A process according to claim 4 wherein said epoxide is styrene oxide.

6. A process according to claim 5 wherein said solvent is styrene.

7. A process according to claim 3 wherein said anhydride is maleic anhydride and said epoxide is styrene oxide, the time spent in stages $b$ and $c$ combined being less than 160 seconds and the time from the initiation of the self-sustaining exothermic reaction to the time the peak temperature is reached is less than 100 seconds.

8. A process according to claim 7 wherein the reaction is carried out in the presence of a maleate ester isomerization catalyst.

9. A process according to claim 8 wherein the reaction mixture contains for 0.01 to 0.10 mole of morpholine per mole of anhydride.

10. A process according to claim 9 wherein said solvent is styrene.

11. A process according to claim 7 wherein the catalytically effective quaternary salt is one having the formula $R_4MX$, wherein the R groups are the same or different $C_1$-$C_8$ hydrocarbon radicals, M is N or P and X is a bromine or chlorine, or an alkoxy, hydroxyl or phenoxy group.

12. A process according to claim 11 wherein the quaternary salt is selected from tetramethyl ammonium bromide, tetramethyl ammonium hydroxide, tetraethyl ammonium bromide and tetraethyl ammonium hydroxide.

13. A process according to claim 1 wherein said diacid anhydride is an aromatic dicarboxylic acid anhydride.

14. A process according to claim 13 wherein said aromatic dicarboxylic acid anhydride is phthalic anhydride.

15. A process according to claim 13 wherein said epoxide is styrene oxide.

16. A process according to claim 13 wherein said catalytically effective quaternary salt is one having the formula $R_4MX$, wherein the R groups are the same or different $C_1$-$C_8$ hydrocarbon radicals, M is N or P and X is bromine or chlorine, or an alkoxy, hydroxyl or phenoxy group.

17. A process according to claim 13 wherein said quaternary salt is selected from tetramethyl ammonium bromide, tetramethyl ammonium hydroxide, tetraethyl ammonium bromide and tetraethyl ammonium hydroxide.

* * * * *

UNITED STATES PATENT OFFICE
CERTIFICATE OF CORRECTION

PATENT NO. : 4,116,944
DATED : September 26, 1978
INVENTOR(S) : James C. Hill, Walter R. Knox It is certified that error appears in the above-identified patent and that said Letters Patent are hereby corrected as shown below:

Column 9, line 28, "for" should be --from--.

Signed and Sealed this

Seventeenth Day of July 1979

[SEAL]

Attest:

LUTRELLE F. PARKER

Attesting Officer     Acting Commissioner of Patents and Trademarks